United States Patent [19]

Müller et al.

[11] 4,348,874
[45] Sep. 14, 1982

[54] MULTIPLE SPLINE HUB, PARTICULARLY FOR A TELESCOPIC SHAFT

[75] Inventors: Helmut Müller; Heinz Schweizer, both of Heidenheim, Fed. Rep. of Germany

[73] Assignee: Voith Transmit GmbH, Fed. Rep. of Germany

[21] Appl. No.: 139,473

[22] Filed: Apr. 11, 1980

[30] Foreign Application Priority Data

Apr. 28, 1979 [DE] Fed. Rep. of Germany ....... 2917391

[51] Int. Cl.³ .............................................. F16C 1/00
[52] U.S. Cl. .................................... 464/162; 464/182; 464/183
[58] Field of Search ................... 64/1 R, 1 S, 23, 23.5, 64/17 SP

[56] References Cited

U.S. PATENT DOCUMENTS

| | | | |
|---|---|---|---|
| 1,784,436 | 12/1930 | Hadley | 64/1 S |
| 3,269,146 | 8/1966 | Stanley | 64/1 R |
| 4,014,184 | 3/1977 | Stark | 64/1 R |

FOREIGN PATENT DOCUMENTS 839155  6/1960  United Kingdom ................... 64/18

*Primary Examiner*—Ira S. Lazarus
*Attorney, Agent, or Firm*—Ostrolenk, Faber, Gerb & Soffen

[57] ABSTRACT

The disclosure concerns a multiple-spline hub that is particularly useful for a telescopic shaft for transmitting torque. There is a thin-walled tube section which is developed as a toothed profile tube having teeth of trapezoidal cross-section. There is a thicker-walled tube to which the connecting element of the telescopic shaft, such as a joint fork, is attached. The toothed tube section is inserted in the bore of the thicker-walled tube and the crests of the teeth of the tube section engage the interior surface of the bore of the tube. The crests of the teeth are bonded by brazing to the bore of the thicker-walled tube.

8 Claims, 1 Drawing Figure

MULTIPLE SPLINE HUB, PARTICULARLY FOR A TELESCOPIC SHAFT

BACKGROUND OF THE INVENTION

The invention concerns a multiple spline hub, particularly for use on a telescopic shaft. The hub has a thin-walled tube section which is developed by means of cold-rolling as a toothed profile tube. It also has a connecting element, for instance a flange, a joint fork or the like, to which the toothed profile tube is connected.

German Petty Patent (Gebrauchsmuster) No. 1,911,806 shows a multiple-spline hub for a telescopic shaft. The hub is a part of a cardan shaft. The hub comprises a toothed-profile tube, which is fastened at a non-profiled end region to a joint fork. The toothed profile tube is manufactured starting with a tube of circular cross-section, and the profile is formed in the tube from the outside to the inside by drawing or pressing.

Apparently because of the above-described method of manufacture, the profile of the teeth in the known multiple-spline hub is rather large, as compared with the diameter of the hub. Accordingly, the number of teeth is small. The tooth heads are also quite rounded.

In a similar known multiple-spline hub, the toothed profile tube has a smaller pitch and accordingly has a larger number of teeth. In addition, there is a more desirable trapezoidal tooth profile. The toothed-profile tube is produced here by the cold-rolling of a thin-walled tube. For this purpose, the tube is placed on a profile mandrel. In this known multiple-spline hub, the torque carrying capacity is probably higher than in the case of the first mentioned hub embodiment. Furthermore, the method of manufacture of this toothed-profile tube in mass production is rather favorable both with respect to precision and with respect to cost. The level of torque which can be transmitted with this known construction is, however, still too small for many applications. The difficulty resides in the fact that manufacturing the toothed profile tube by cold rolling makes it necessary to start with a tube of only very slight wall thickness of, for instance, 1.5 to 2 mm.

For these reasons it has been necessary to manufacture those multiple-spline hubs which are to be capable of withstanding heavy loads by means of other traditional methods, such as producing the inner toothing of the hub by machining processes, for instance, slotting or reaming of the hub.

SUMMARY OF THE INVENTION

The object of the present invention, therefore, is to develop a multiple-spline hub of the aforementioned type in such a manner that, while the toothed profile tube can still by produced by cold rolling, it can transmit substantially higher torques than heretofore.

According to the invention, the multiple-spline hub is comprised of a thick-walled carrier tube with a smooth interior cylindrical surface and a thin-walled, toothed profile tube inserted in the carrier tube and secured to the interior cylindrical surface. A connecting element, such as a joint fork, is attached to the carrier tube. Thus, the transmission of the torque from the hub toothing to the connecting element, for instance, the joint fork, no longer takes place via the toothed profile tube itself, but instead via the thick-walled carrier tube with which each individual tooth head of the toothed profile tube is connected. By the embedding or securement of the thin-walled toothed profile tube in the thick walled carrier tube, the torque to be transmitted can be increased to such an extent that in individual regions of the sheetmetal toothing, elastic or even plastic deformations take place so that an increase in the load-carrying proportion can be expected under load.

Preferably, a brazing process is used for connecting the toothed profile tube with the carrier tube, because in this case, a large number of hollow fillet solder seams are formed, which correspond to the number of teeth. As a whole, a quite strong solder connection is to be expected. By the hardening of the toothing, preferably by a nitriding process, such as the so-called Nitemper process described in Ipsen's Technical Reports "Industrial Heat-Treating" Nr. 23/E and Nr. 4/D (Walzel and Kria), both good sliding properties and effective protection against corrosion can be obtained.

Other objects and features of the invention will be apparent from the following description, taken with reference to the drawings.

DESCRIPTION OF A PREFERRED EMBODIMENT

Figure 1:
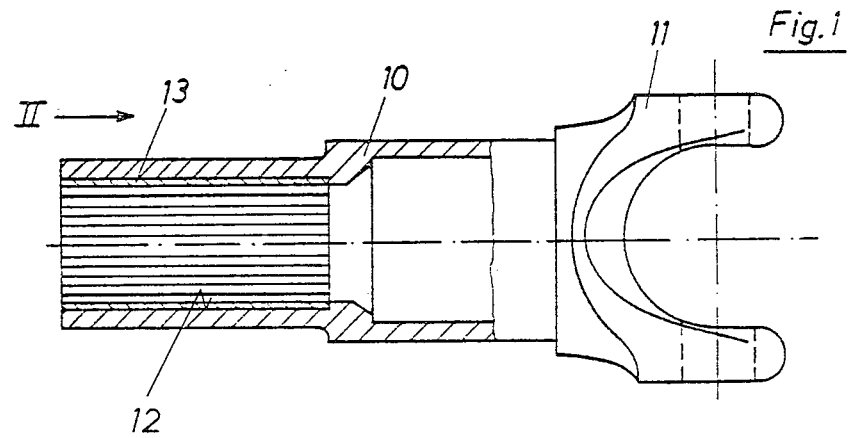
FIG. 1 shows a multiple spline hub according to the invention, predominately in longitudinal section.
Figure 2:
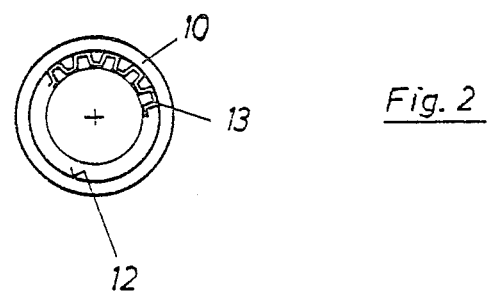
FIG. 2 is an end view of the multiple-spline hub of FIG. 1, seen in the direction of the arrow II in FIG. 1.

The multiple-spline hub shown in the drawings is one half of a telescopic shaft which is part of a cardan joint, with length equalization. The multiple-spline hub comprises a thick-walled, circular-cylindrical carrier tube 10 having a wall thickness of between about 10 and 20 mm. The tube 10 is connected on one end thereof to a joint fork 11. At the opposite end, the carrier tube 10 has a concentric, circular-cylindrical, untoothed bore 12.

A thin-walled circular-cylindrical, toothed profile tube 13 having a wall thickness of between about 1.5 to 2 mm is inserted into the bore 12. The toothed profile on the tube 13 is produced by cold rolling. The teeth produced are trapezoidal in cross-section, and they therefore have flat crests, which are better able to engage the interior surface of the bore 12. The diameter of the tube 13 is selected so that the tooth crests will tightly engage the interior surface of the bore 12. The toothed profile tube 13 is fastened in the carrier tube 10 by brazing, particularly at the crests of the teeth of the tube 13.

The other half of the telescopic shaft is not shown in the drawings. However, it is a multiple-spline shaft which has an outer toothing that exactly fits the toothed profile tube 13. It can also be produced by cold rolling.

By means of the invention, it is possible to produce cardan shafts of high load-carrying capacity in a very economical manner using one device for carrying out the cold-rolling process both for the multiple-spline hub and for the multiple-spline shaft. This was possible heretofore only in the manufacture of cardan shafts of very light construction.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A multiple-spline hub for a telescopic shaft for transmitting torque, the hub comprising:

a thin-walled circular-cylindrical tube section, developed as a toothed profile tube having teeth which extend linearly and parallel to the axis of the telescopic shaft; the teeth being adapted over their entire length for transmission of torque and the teeth being shaped for permitting displacement of the profile tube over a cooperating spline shaft;

a second tube which is thick-walled; a connecting element of the telescopic shaft being connected to the second tube for moving therewith; the second tube having a bore with an inner surface, and the second tube bore being sized so that the inner surface of the bore engages the teeth of the profile tube; the toothed profile tube being inserted over substantially its entire length in the bore of the second tube and the profile tube being connected with the second tube bore inner surface.

2. The multiple-spline hub of claim 1, wherein the inner surface of the second tube bore is cylindrical and untoothed and the teeth of the profile tube have crests which engage the inner surface of the second tube bore for being connected thereto.

3. The multiple-spline hub of either of claim 1, wherein the profile tube teeth have crests and the tooth crests are connected to the second tube bore inner surface.

4. The multiple-spline hub of any of claims 1, 2 or 3, wherein the profile tube teeth are of trapezoidal cross-section.

5. The multiple-spline hub of claim 4, wherein the profile tube teeth are connected by brazing to the second tube bore inner surface.

6. The multiple-spline hub of claim 1, wherein the profile tube teeth are connected by brazing to the second tube bore inner surface.

7. The multiple-spline hub of claim 1, further comprising means bonding the profile tube in the second tube bore.

8. The multiple-spline hub of any of claims 1, 3, 6 or 7, wherein the profile tube is nitrided for hardening the profile tube.

* * * * *